(12) United States Patent
Nanda et al.

(10) Patent No.: US 6,792,512 B2
(45) Date of Patent: Sep. 14, 2004

(54) METHOD AND SYSTEM FOR ORGANIZING COHERENCE DIRECTORIES IN SHARED MEMORY SYSTEMS

(75) Inventors: Ashwini Nanda, Mohegan Lake, NY (US); Krishnan Sugavanam, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 10/214,085

(22) Filed: Aug. 6, 2002

(65) Prior Publication Data

US 2004/0030841 A1 Feb. 12, 2004

(51) Int. Cl.⁷ ............................................. G06F 12/00
(52) U.S. Cl. ....................... 711/144; 711/141; 711/147; 711/207; 711/221
(58) Field of Search ............................... 711/144, 141, 711/147, 207, 221

(56) References Cited

U.S. PATENT DOCUMENTS

| | | | |
|---|---|---|---|
| 4,484,267 A | * 11/1984 | Fletcher | 711/124 |
| 5,522,058 A | * 5/1996 | Iwasa et al. | 711/145 |
| 5,802,578 A | * 9/1998 | Lovett | 711/147 |
| 6,338,123 B2 | 1/2002 | Joseph et al. | 711/144 |
| 6,629,203 B1 | * 9/2003 | Humlicek | 711/114 |
| 2001/0034816 A1 | * 10/2001 | Michael et al. | 711/119 |

OTHER PUBLICATIONS

R. Simoni et al., "Modeling the Performance of Limited Pointers Directories for Cache Coherence" ACM, 1991, pp. 309–318.

* cited by examiner

Primary Examiner—Matthew Kim
Assistant Examiner—Stephen Elmore
(74) Attorney, Agent, or Firm—McGinn & Gibb PLLC; Derek S. Jennings

(57) ABSTRACT

A method and structure for a "dynamic CCR/sparse directory implementation," includes maintaining state information of the main memory cached in the shared caches of the other compute nodes, organizing a cache directory so that the state information can be stored in a first area efficient CCR directory format, switching to a second sparse directory format if the entry is shared by more than one other compute node, and dynamically switching between formats so as to maximize the number of entries stored in the directory.

34 Claims, 8 Drawing Sheets

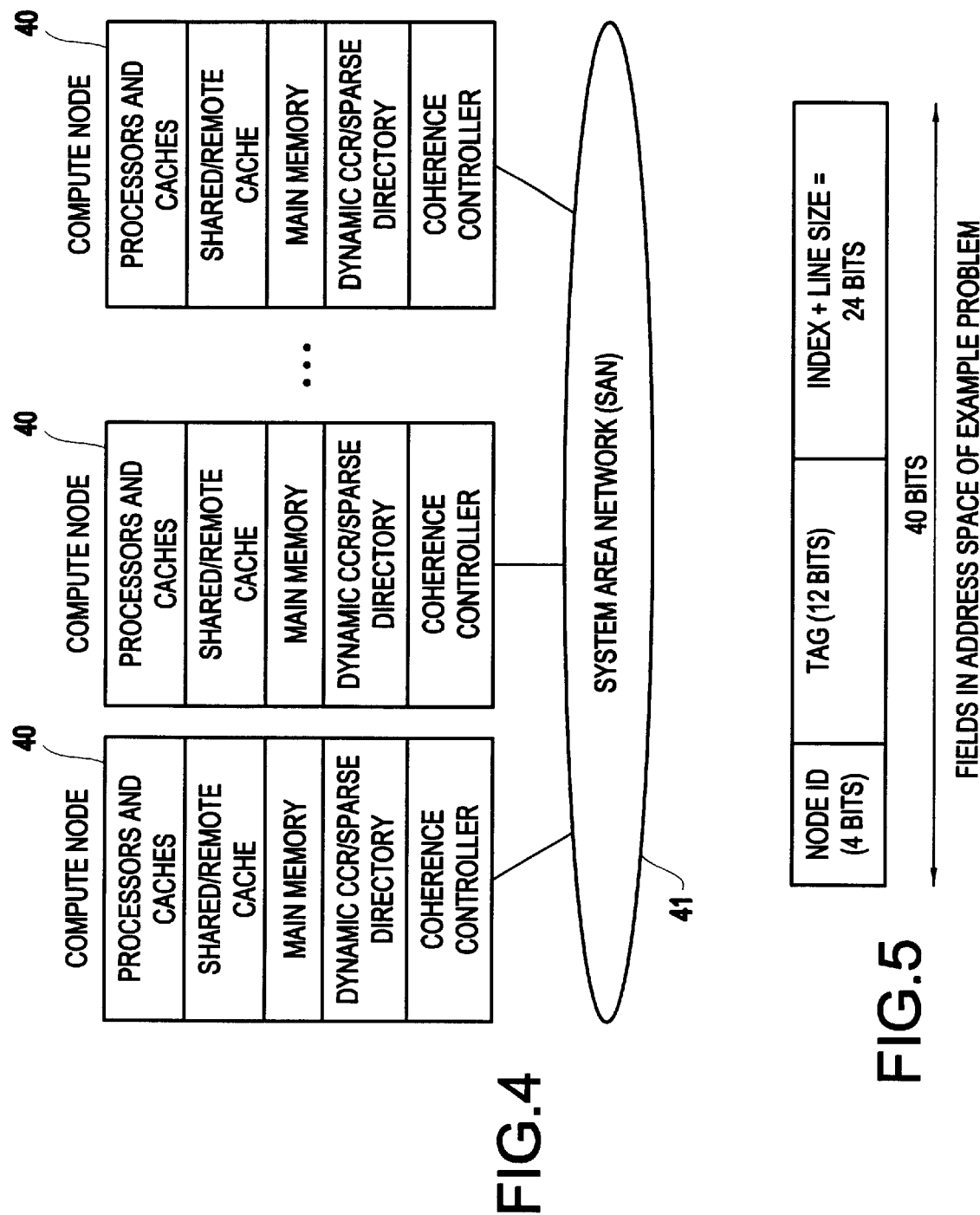

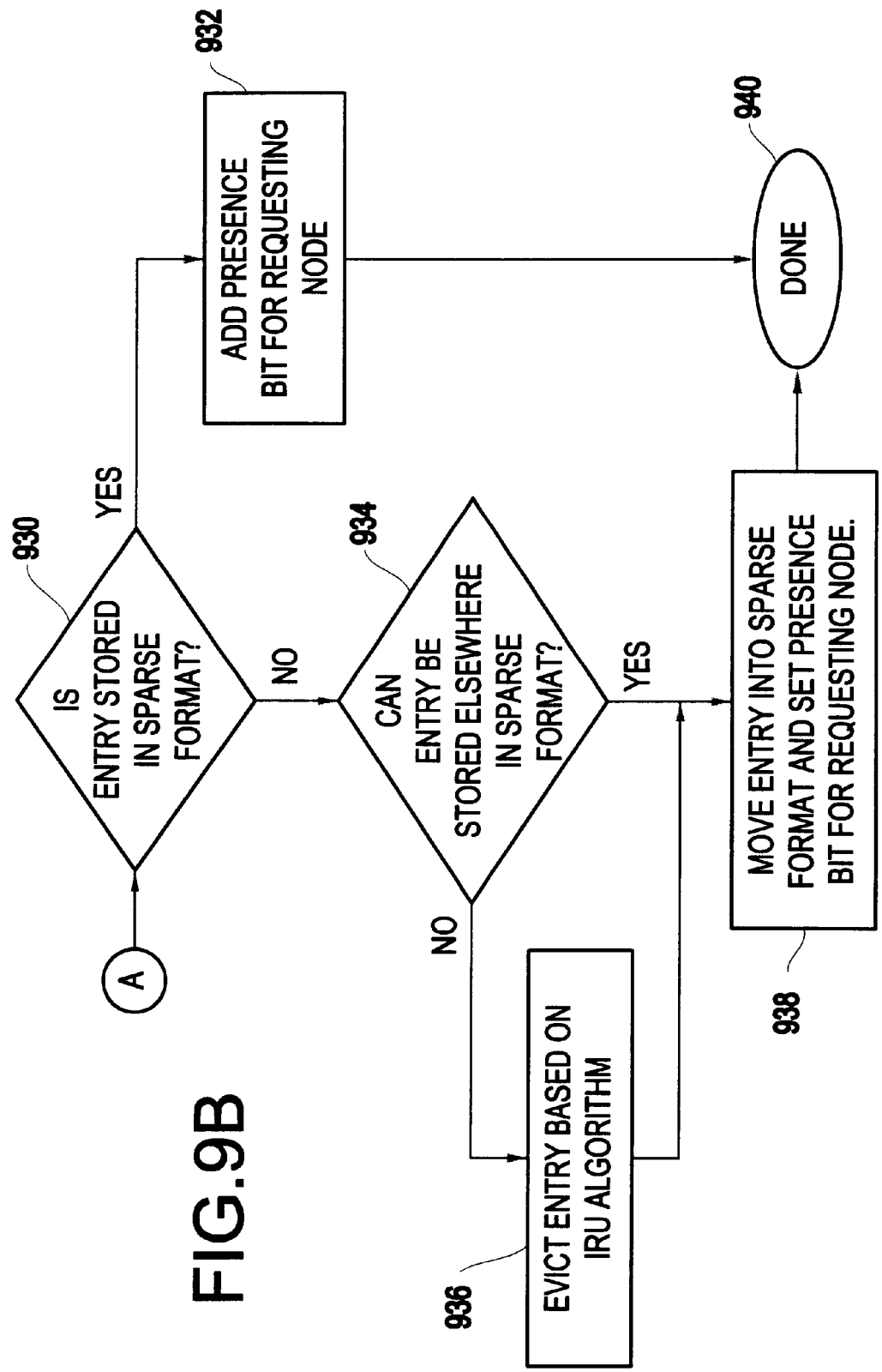

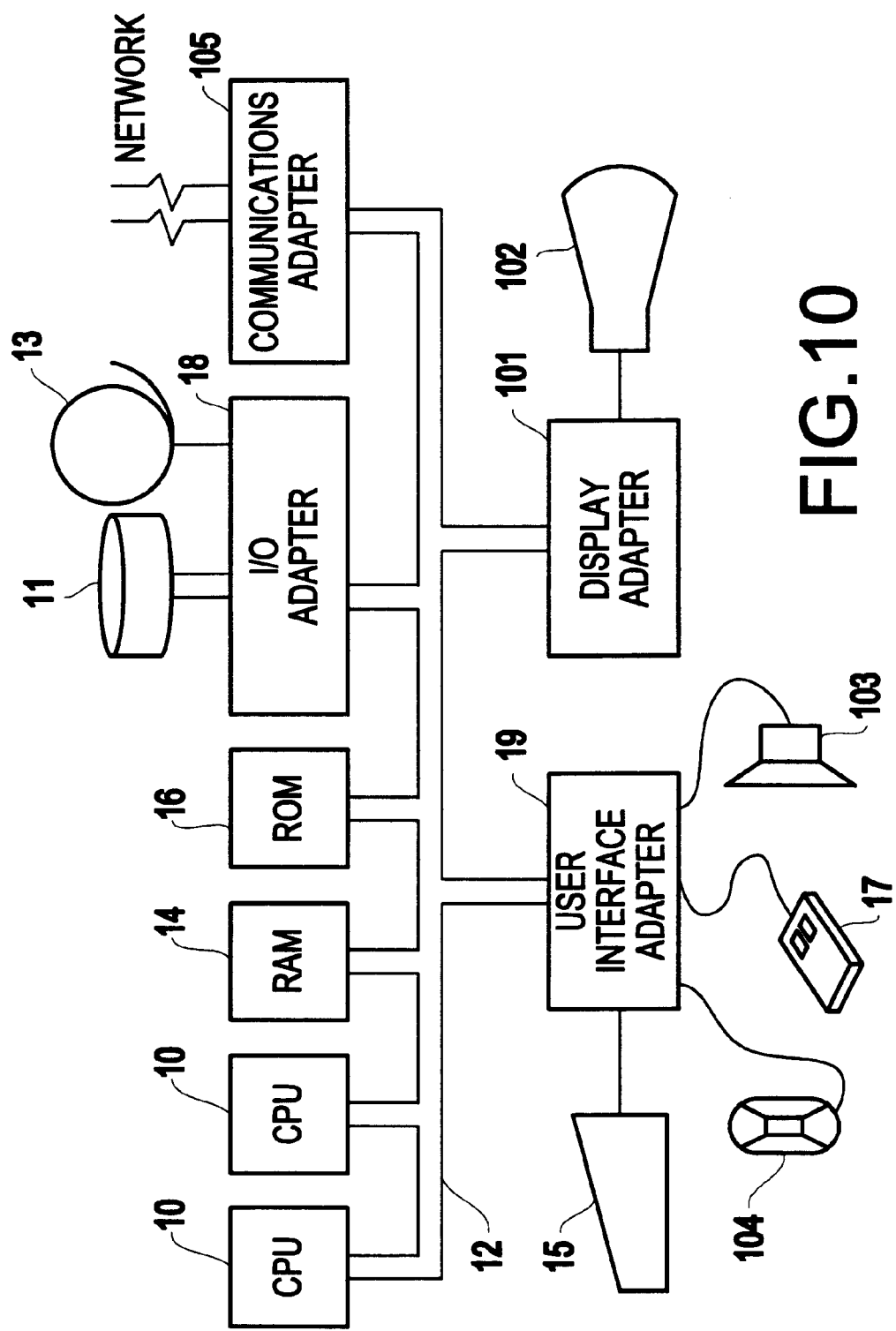

METHOD AND SYSTEM FOR ORGANIZING COHERENCE DIRECTORIES IN SHARED MEMORY SYSTEMS

BACKGROUND OF THE INVENTION

1. Field of the Invention

The present invention relates to efficient storage of memory line states in shared memory multiprocessor systems using directory based cache coherence.

2. Description of the Related Art

Processors use on chip or off chip cache memories to speed up accesses to system memory. In a shared memory multiprocessor system, more than one processor can store a copy of the same memory location (or line) in their respective cache memories. There has to be a cache coherence mechanism to maintain consistency among the multiple cached copies of the same memory line. In small, bus based multiprocessor systems, the coherence mechanism is usually implemented as a part of the cache controller using a snoopy coherence protocol. The well-known snoopy protocol cannot be used in large systems that are connected through an interconnection network due to the lack of a bus. As a result, these systems use a directory based protocol to maintain cache coherence.

The directories within each node of the network are associated with the main memory and keep the state information on the memory lines such as which cache has a copy of the line or whether the line has been modified in a cache and so on. Conventionally, these directories are organized as "full map" directories where the state information of every single memory line is stored by mapping each memory line to a unique location in the directory maintained by each node. The full map scheme assigns space for state information of each memory line whether it is cached in another node or not. The drawbacks of this scheme are the large area occupied by the directory and the increase in directory size with increase in memory size.

To solve this problem, "sparse directories" have been proposed which have the capability to store the state of a limited number of memory lines. The drawbacks of the sparse directory approach are the performance loss due to the forced invalidation of lines from the processors' caches when they run out of directory space and a relatively complex coherence protocol. Recently, a complete and concise remote (CCR) directory scheme has been proposed (U.S. Pat. No. 6,338,123, incorporated herein by reference) where the directory keeps state information only on the memory lines that are currently cached in a remote node. This scheme has the advantage that its size is proportional to the size of the caches in the system and it does not have to force any invalidations. However, it is desired to decrease the size of the directory even further (as the directory size is proportional to the number of memory lines cached in the system and the cache size of contemporary systems is growing) and to prevent the directory from having to grow linearly with an increase in the number of nodes.

SUMMARY OF THE INVENTION

It is, therefore, an object of the present invention to provide a method for maintaining coherence of memory lines in a shared memory multiprocessor system that includes a system area network and a plurality of compute nodes connected to the system area network. FIG. 4 represents one example of such a system. Each of the compute nodes includes a main memory, a shared cache, a coherence controller, and a directory. The invention, sometimes referred to herein as the "dynamic CCR/sparse directory implementation," includes a method of: maintaining state information of the main memory cached in the shared caches of the other compute nodes; organizing a cache directory so that the state information can be stored in a first area efficient CCR directory format; switching to a second sparse directory format if the entry is shared by more than one other compute node; and dynamically switching between formats so as to maximize the number of entries stored in the directory.

This inventive directory mechanism is structurally similar to the CCR directory, yet maintains sparse directory characteristics of having a fraction of the total number of lines present in the external shared caches. Each entry in this structure could store one line in a sparse format or multiple lines in a CCR format. The invention first attempts to store entries in a CCR format as much as possible so as to maximize the number of lines stored. As nodes start to share the line, the format dynamically switches to that of a sparse implementation.

In addition, the shared memory multiprocessor system is a system area network and plurality of compute nodes connected to the system area network, each of the compute nodes includes a main memory, a shared cache connected to the main memory, a CCR/sparse shadow directory connected to the shared cache, and a coherence controller connected to the CCR/sparse shadow directory. The directory is adapted to store entries, representing lines in the shared cache, in a first format or a second format. The first format represents a single node's sharing of a single line in the shared cache and the second format represents a plurality of nodes' usage of a single line in the shared cache. The first format has one identifier bit, tag bits, one presence bit, and one modified bit. The size of the CCR/sparse shadow directory is adapted to store the entries in the first format only if the memory lines referenced by the entries are shared by exactly one node. The second format has one identifier bit, tag bits, presence bits, and one modified bit. The CCR/sparse shadow directory is adapted to store the entries in the second format if the memory lines referenced by the entries are shared by more than one node and attempts to store the entries in the first format before storing the entries in the second format. The CCR/sparse shadow directory is limited in size and the CCR/sparse shadow directory is further adapted to evict items from the CCR/sparse shadow directory if insufficient space is available to store a new entry.

The number of lines stored with the invention far exceeds the number of lines stored in a conventional sparse directory implementation of comparable area in the best case and reverts to the same number of lines-as that of a sparse directory implementation of comparable area in the worst case. Many technical benchmarks have shown that single node invalidations heavily dominate multiple node invalidations, strengthening the possibility that this implementation would result in the storage of more lines compared to that of a sparse implementation. Hence, the invention reduces the forced invalidations compared to a conventional sparse directory implementation having similar area constraints.

BRIEF DESCRIPTION OF THE DRAWINGS

The foregoing and other objects, aspects, and advantages will be better understood from the following non limiting detailed description of preferred embodiments of the invention with reference to the drawings that include the following:

FIG. 4 is a block diagram on one preferred system embodying the present invention;

FIG. 5 illustrates the tag, node id and index fields in the address space of the example problem;

FIGS. 9A–9C are flowcharts illustrating an algorithm for implementing the dynamic CCR/sparse directory; and FIG. 10 is a hardware embodiment of the invention.

DETAILED DESCRIPTION OF PREFERRED EMBODIMENTS OF THE INVENTION

Figure 1:
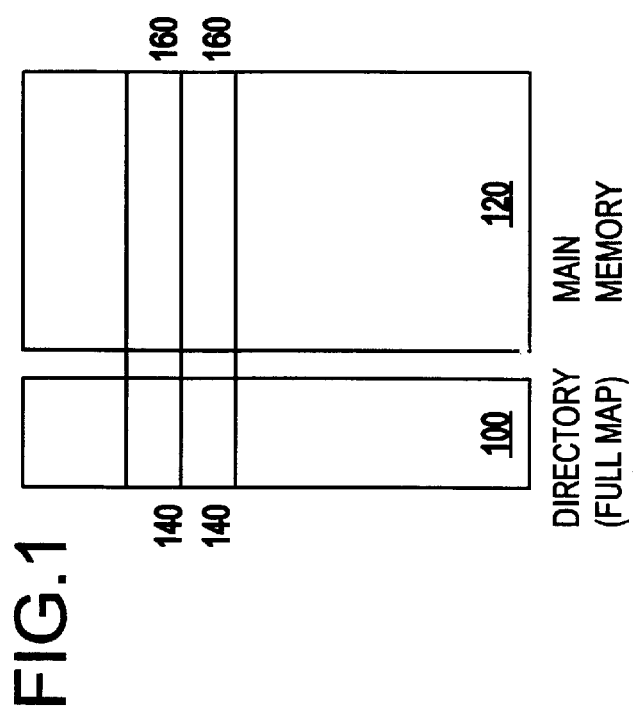
FIG. 1 is a schematic diagram of a full map memory directory structure.

As mentioned above, some coherence directories are organized as "full map" directories where the state information of every single memory line is stored by mapping each memory line to a unique location in the directory. FIG. 1 is a representation of a "full map" arrangement. A memory directory 100 is provided for main memory 120. In this implementation, entries 140 of the main directory 100 include state information of each memory line 160 of main memory 120. There is a one to one (state) mapping between a main memory line 160 and a memory directory entry 140 (i.e., there is full mapping). The full map scheme assigns space for state information of each memory line whether it is cached in another node or not. The drawbacks of this scheme are the large area occupied by the directory and the increase in directory size with increase in memory size.

Figure 2:
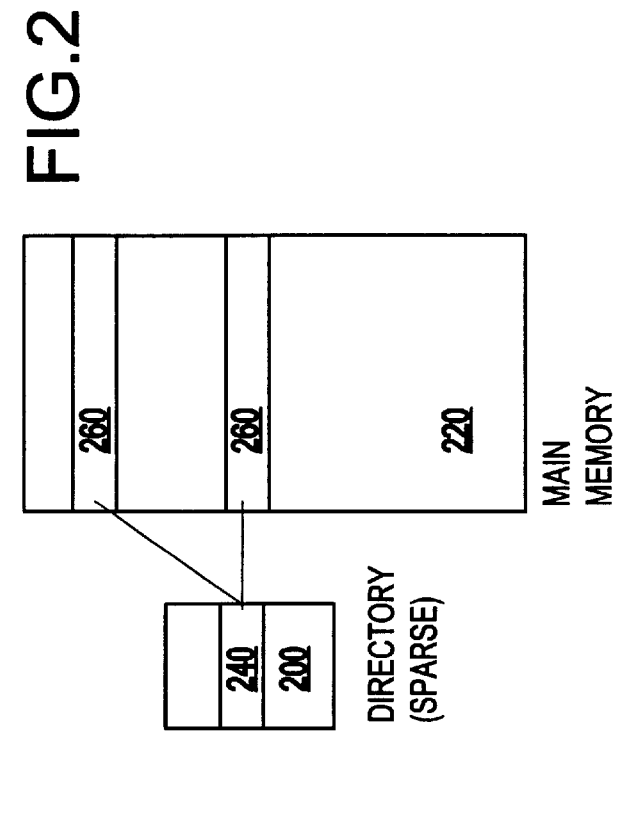
FIG. 2 is a schematic diagram of a sparse directory structure.

As also mentioned above, "sparse directories" have the capability to store the state of a limited number of memory lines. FIG. 2 is a representation of the sparse directory arrangement. A sparse directory 200 is smaller in size than the main memory directory 100 of FIG. 1 and is organized as a subset of the memory directory 100. The sparse directory 200 includes state information entries 240 for only a subset of the memory lines 260 of main memory 220. For a "n" node system, an entry in the sparse implementation stores "T" tag bits+"n−1" presence bits+1 modified bit for a total of "T+n" bits per entry. A particular memory line can be present in any or some or all of the "n−1" external shared caches and hence the necessity of "n−1" presence bits. This format of "T+n" bits would hence forth be called the "sparse format". The drawbacks of the sparse directory approach are the performance loss due to the forced invalidation of lines. More specifically, lines from the processors' caches are invalidated when a sparse directory entry has to be replaced due to contention among memory lines for the same sparse directory entry. Further, the sparse directory has a relatively complex coherence protocol.

Figure 3:
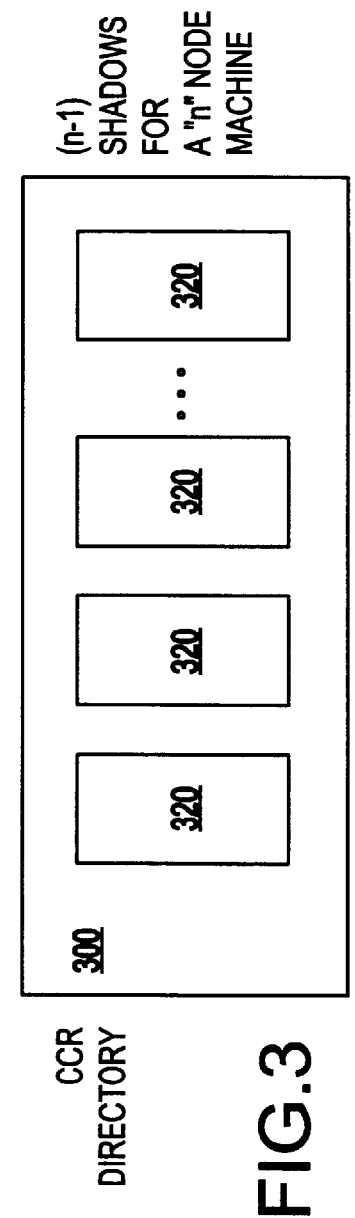
FIG. 3 is a schematic diagram of a CCR directory structure.

The complete and concise remote (CCR) directory scheme is illustrated in FIG. 3. The CCR directory 300 maintains shadow directories 320, where each shadow directory corresponds to one of the external shared caches. These shadow directories include state information of the local main memory cached in the external shared caches. In general, for a "n" node system, an entry in the CCR implementation stores "T" tag bits+1 presence+1 modified bit for a total of "T+2" bits per entry (hence forth referred to as the "CCR format"). This scheme has the advantage that its size is proportional to the size of the caches in the system and it does not have to force any invalidations. The size of the CCR directory grows linearly with increase in the number of nodes.

The invention improves upon this design by decreasing the size of the directory even further while still preventing the directory from having to grow linearly with an increase in the number of nodes. In addition, the invention minimizes the number of forced invalidations.

One example of the inventive computer system, that is shown in FIG. 4, includes compute nodes 40 connected to a system area network 41. Each of the compute nodes includes processors and caches; a shared/remote cache; a main memory; the inventive dynamic CCR/sparse directory; and a coherence controller interconnected to each other. The details of the dynamic CCR/sparse directory are explained below.

Figure 6:
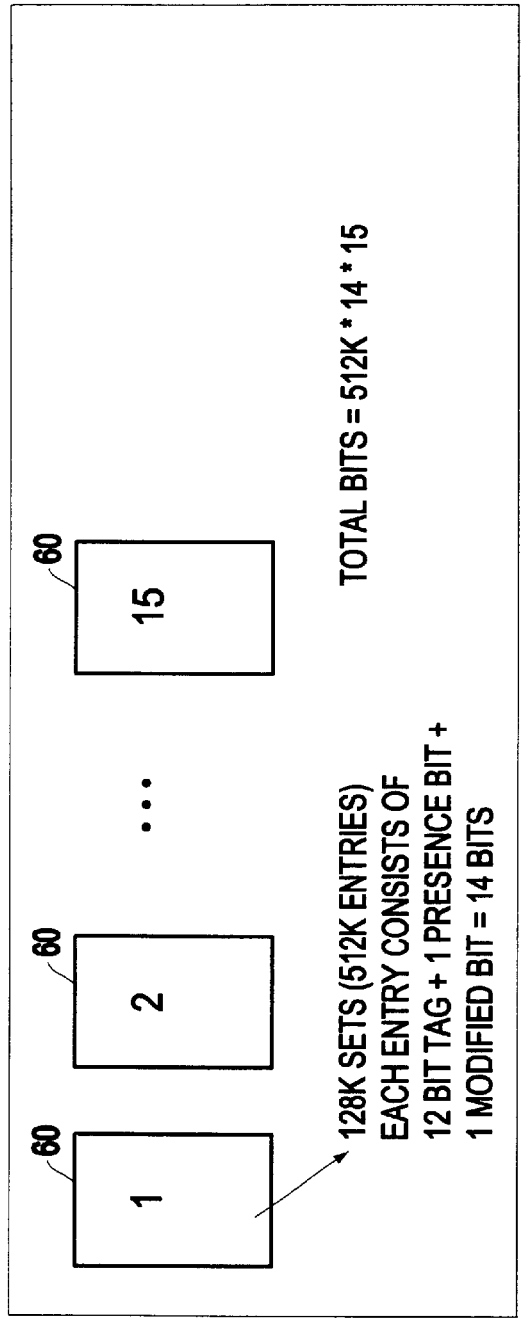
FIG. 6 is a CCR implementation of the example problem.
Figure 7:
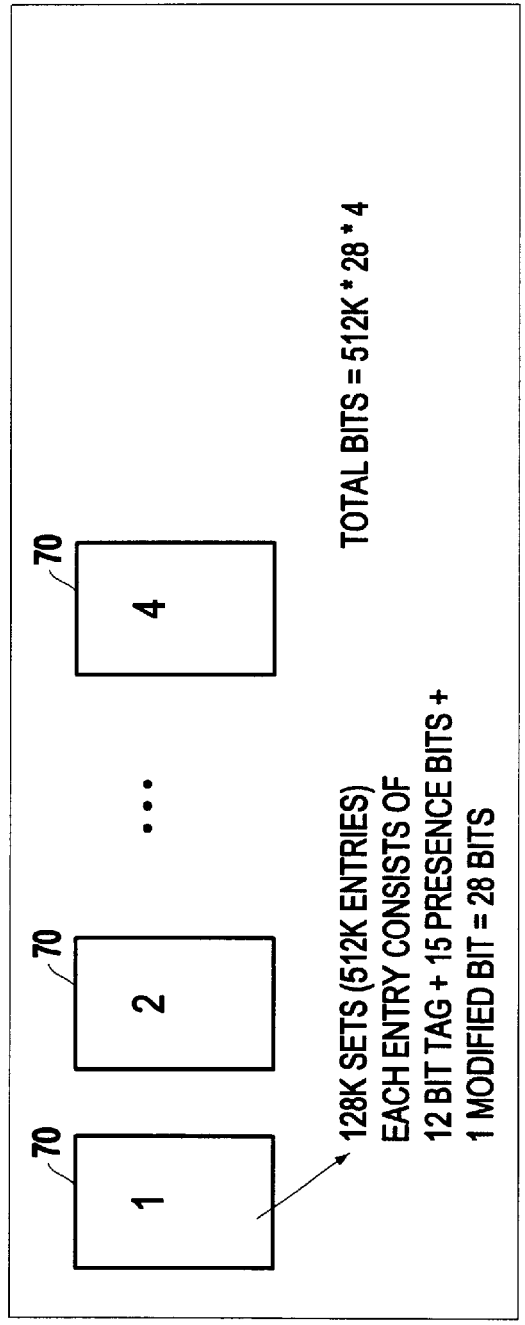
FIG. 7 is a sparse implementation of the example problem.
Figure 8:
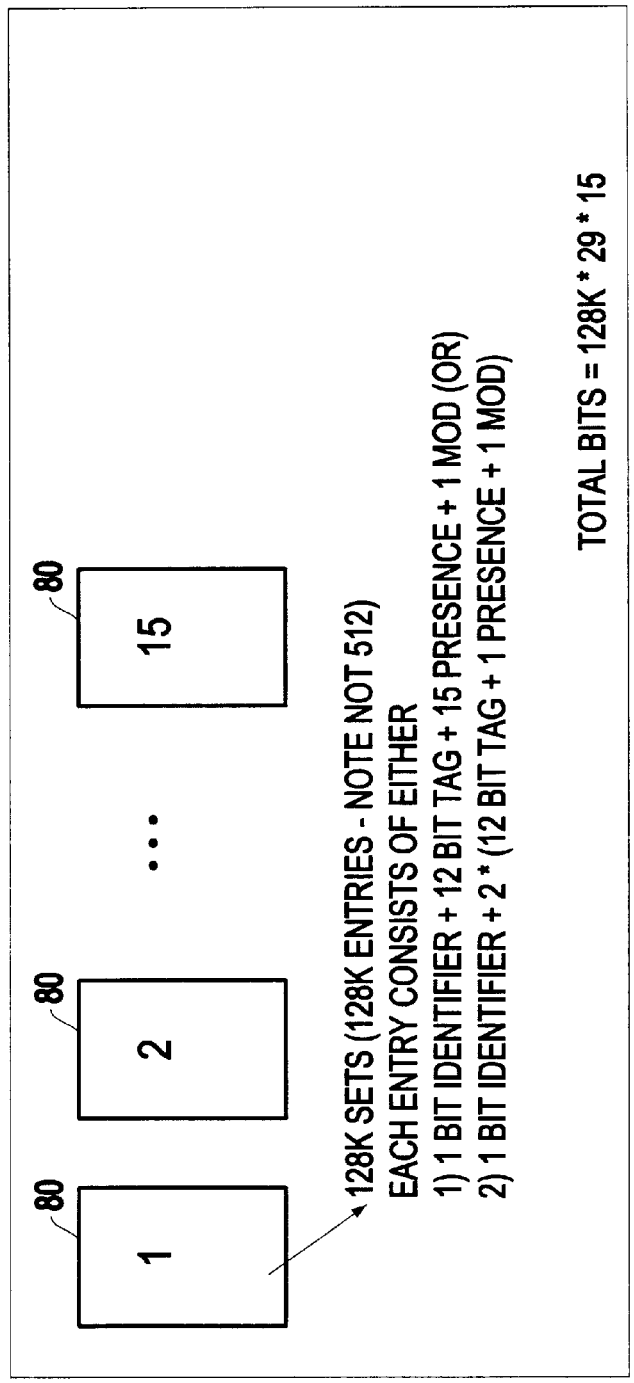
FIG. 8 is a dynamic CCR/sparse implementation of the example problem.

The inventive dynamic CCR/sparse implementation is further illustrated in the following example. This example uses a 16 node NUMA system with a terra byte of memory address space with each node having a 64 MB 4 way set associative cache. The cache line size is 128 bytes. This results in the cache of every node having 128 K 4 way associative sets (512K entries). FIG. 5 illustrates the tag 51, node id 52, and index fields 53 in the address space 50 of the above example. With a full map implementation, the directory has 512M entries (1 terra byte/16 nodes/128 byte line size) which is prohibitive from the area point of view (e.g., too large). FIGS. 6 and 7 show, respectively, a CCR solution and sparse directory solution to this problem, and FIG. 8 illustrates the invention's solution to this problem.

More specifically, a classic CCR solution to the above problem is shown in FIG. 6, where the CCR directory in every node contains a shadow 60 of all the external shared caches present in the system. In order to accommodate all entries within each of the remote nodes' shared cache, each of the 15 shadow directories 60 in this example are large enough (512K) to accommodate all possible cache lines. Hence, each shadow contains 512K entries with each entry storing 14 bits (12 bit tag, 1 presence bit and 1 modified bit). The tag bits identify the node and the exact memory line which is cached. The modified bit indicates whether the memory line is stored by a node for writes (and the data in main memory may be stale compared to the data stored in the cache of the node holding the line). This results in a total of 512K*14*15=105 M bits stored. The total cache lines present in the system is 512K*16=8 M lines.

As discussed above, the advantages of this solution include that a full mapping is provided and that only two bits in addition to the number of tag bits is needed. The disadvantages of the classical CCR solution are its storage area requirements, the fact that tags may be duplicated if the data is shared by more than one cache, and that many entries may be empty (e.g., when the particular presence bit indicates that the other node does not share that memory line).

A sparse implementation that will only store, for example, one-fourth of the total cache lines present in the system is shown in FIG. 7. This implementation has 2M entries 70 with each entry containing 28 bits (12 bit tag+15 presence+1 modified bit). Unlike the CCR format, the sparse format needs 15 presence bits to identify whether each of the other 15 nodes share this line in the shared cache. This results in a total of 56 M bits stored. The sparse implementation occupies approximately one-half the area of the CCR implementation, but might result in multiple invalidations if an entry has to be evicted from the directory. This implementation of the sparse directory has a 16 way associativity (so that its associativity is comparable to the inventive dynamic CCR/sparse directory implementation shown below). As mentioned above, the advantages of a sparse directory are that it saves valuable memory area. However, with sparse directories, it may be necessary to perform invalidations and a larger entry line is required because the entry line must include the tag bits and a bit for every other node. Also, the size of the directories must be uniquely determined, which adds complexity and may never produce an optimal size.

In view of these problems, the invention provides the dynamic CCR/sparse implementation shown in FIG. 8. The inventive CCR/sparse shadow directories 80 are different than the shadow directories 60 shown in FIG. 6 because the CCR/sparse shadow directories 80 are not full directories. Instead, the CCR/sparse shadow directories 80 do not have a sufficient size, with respect to this example (e.g., 128K), to accommodate all possible memory lines in the other nodes' caches. To the contrary, the shadow directories 60 shown in the classic CCR format in FIG. 6 do have a sufficient size, with respect to this example (e.g., 512 k), to accommodate all possible directory entries. Therefore, the invention saves memory area by utilizing CCR/sparse shadow directories that are smaller than conventional CCR shadow directories. One of the important differences between the CCR/sparse shadow directory and the CCR shadow directory is that the CCR shadow directory (of say node "a") can store only the memory lines that are cached by node "a" while the CCR/sparse shadow directory can store the memory lines that are cached by node "a" in CCR format and the memory lines that are cached by any node in sparse format. In addition, as explained below with respect to FIGS. 9A–9C, the invention minimizes the need to invalidate entries within the CCR/sparse shadow directories by optimally choosing between a sparse format and a CCR format.

The invention accommodates as many multiple entries as possible in a CCR format in the same space occupied by an entry in a sparse format. In the example shown above, the CCR format requires "T+2"=14 bits per entry and the sparse format requires "T+n"=28 bits per entry. Hence, in the same space occupied by an entry in a sparse format, two entries in a CCR format can be stored.

As shown in FIG. 8, the format of each entry in each CCR/sparse shadow directory 80 has either a CCR format or a sparse format, except that each entry includes a one bit identifier to distinguish between the sparse and the CCR formats. Thus, in the sparse format, each directory entry contains (following consistently with the above example) a 1 bit identifier+12 tag bits+15 presence bits+1 modified bit, for a total of 29 bits. In the CCR format, each directory entry contains 1 bit identifier+12 tag bits+1 presence bit+1 modified bit, for a total of 15 bits. An entry in the sparse format requires 29 bits (including the one bit identifier). An entry in the CCR format requires 15 bits (including the one bit identifier). But two entries in the CCR format requires only 1 bit identifier+14+14=29 bits. Hence in the same space occupied by an entry in the sparse format, two entries in the CCR format can be stored. This results in a storage requirement of 128K*29*15=54.375 M bits with the invention which occupies an area less than that of the sparse implementation.

As shown in greater detail below, the invention selectively stores the directory entries in either the CCR format or the sparse format. The number of entries stored in the best case (e.g., all CCR) would be 128K*2*15=3.75M (nearly double the sparse implementation) and the worst case would be 128K*15=1.875M (nearly equal to the sparse implementation).

Therefore, the invention combines the sparse and CCR directory formats in order to reduce the amount of storage area occupied by the directory while still substantially reducing the amount of invalidations. In general, for the inventive dynamic CCR/sparse implementation, if there are n nodes, there should be n–1 arrays (CCR/sparse shadow directories) as with the classic CCR format. However, the number of entries in each CCR/sparse shadow directory can vary from one implementation to another because the invention treats each shadow directory as a sparse directory and only adds entries when necessary. To the contrary, the classic CCR shadow directories include dedicated entries for all lines in each nodes' cache, whether the other nodes' cache uses all its lines or not.

Because each shadow directory is a CCR/sparse shadow directory, the storage area available within each CCR/sparse shadow directories is limited. In order to minimize the number of directory entry evictions, the invention maximizes this available storage area by selectively creating each entry as either a CCR entry or a sparse entry. If only one node on the system is utilizing one of the memory lines, it is more efficient to record that entry in one of the CCR/sparse shadow directories in CCR format because, as shown above, the CCR entries consume less area than the sparse entries.

However, if two nodes on the system share one of the memory lines, this requires a CCR entry in two of the CCR/sparse shadow directories. As shown above, each CCR entry occupies approximately one half the space of a sparse entry. Therefore, two CCR entries in different CCR/sparse shadow directories would consume approximately the same amount of area as a single sparse entry in one directory. Following the same logic, if three nodes share a memory line, three CCR entries would be utilized in three different shadow directories in the CCR format. However, at this point, a single sparse entry in one of the CCR/sparse shadow directories (which, as shown above, represents the shared use of a given memory line by all other nodes) occupies less memory area than the three separate CCR format entries.

With this in mind, the invention only utilizes the CCR format if a single node is using a line in the cache memory. Once the line in cache memory is used by two or more nodes, the invention stores this entry in a sparse format in one of the CCR/sparse shadow directories in order to maximize directory area usage. More specifically, the number of presence bits indicates the number of nodes that are using a line in cache memory. Therefore, when the number of presence bits exceeds one (e.g., when more than one node shares a given memory line), the invention utilizes the sparse format to record the entry in one of the CCR/sparse shadow directories. The invention only utilizes the CCR format when a single node is using a line in the shared cache (e.g., presence bit is equal to one). By performing the above operation, the invention utilizes the smallest area of memory within the directories so as to minimize the number of directory entries that must be evicted for lack of directory area.

Figure 9A:
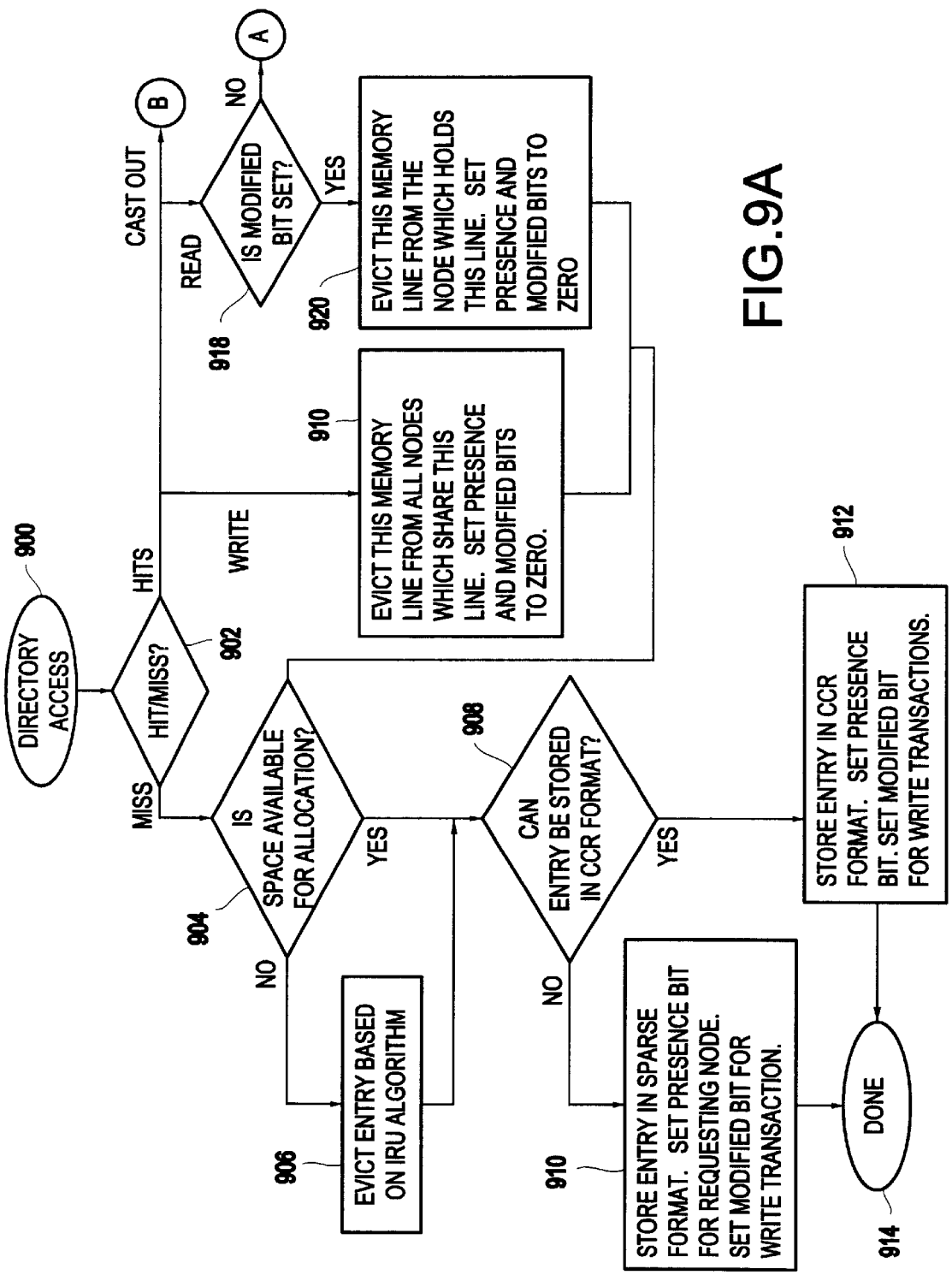
Figure 9C:
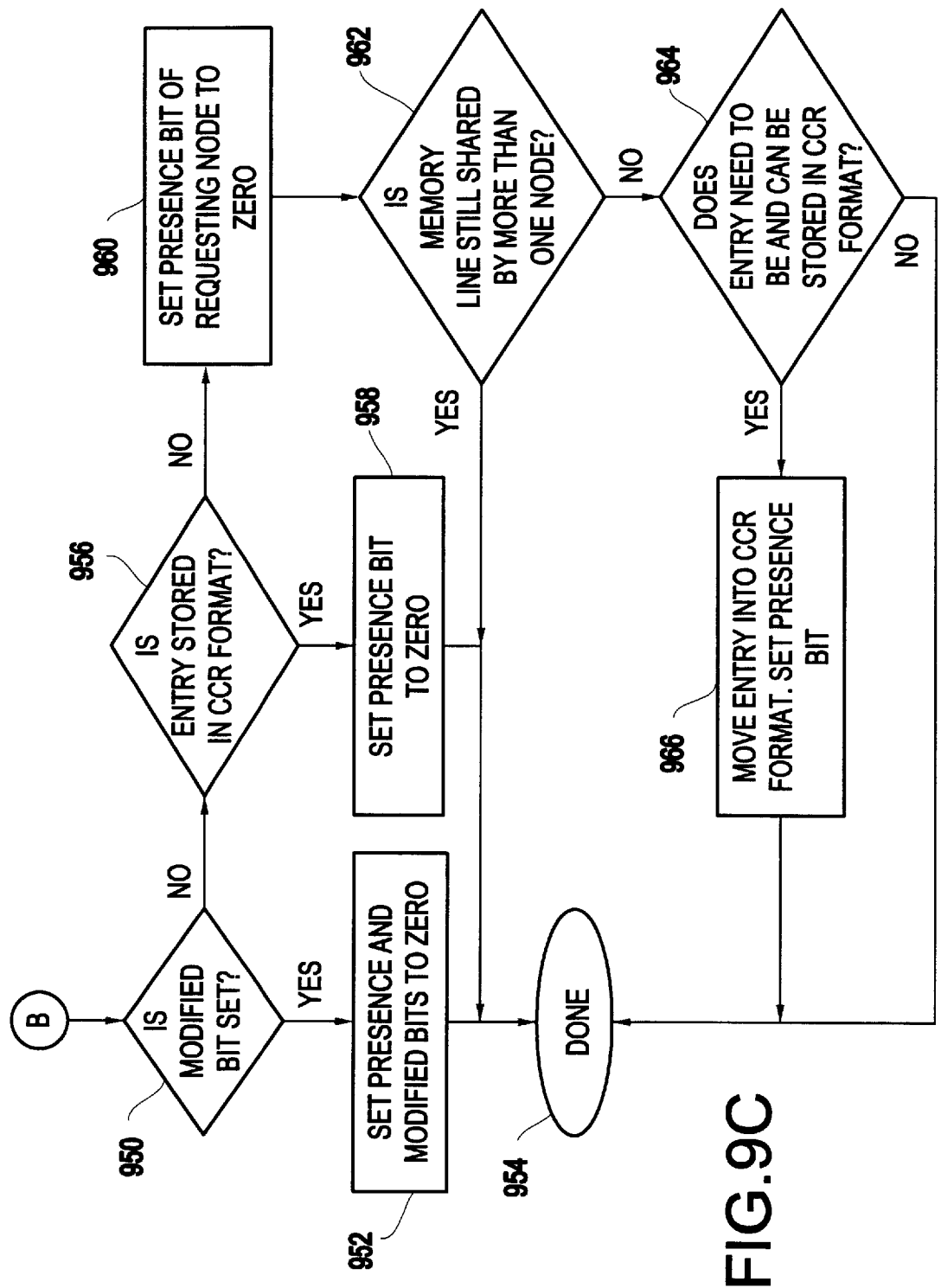

One example for implementing the dynamic CCR/sparse directory is shown in FIGS. 9A–9C. FIG. 9A represents the directory access as item 900. In item 902, the invention determines whether the memory line is currently being used by any of the nodes (e.g., whether there is a "hit" or a "miss" regarding the memory line). If there is a hit, processing proceeds to items 916, 918, and 950, which are discussed below. Otherwise, processing proceeds to item 904 where the invention determines whether there is space available for the new entry in one of the CCR/sparse shadow directories. More specifically, the invention looks at all available CCR/sparse shadow directories to determine whether the entry can be stored.

If there is no space available, the invention evicts a previous entry 906, based on any conventional eviction algorithm. On the other hand, if there is space available, the invention determines whether the entry can be stored in the preferred CCR format in item 908 and stores the entry as such (item 912). In addition, in item 912, the invention sets the presence bit and the modified bit for write transactions. Otherwise, the entry is stored in a sparse format, the presence bit is set for the requesting node and the modified bit is set for a write transaction, as shown in item 910.

If item 902 determines that there is a hit, and the hit is for a write request, processing proceeds to item 916 where the invention evicts the specific memory line from all nodes which share this line. Then, the invention sets the presence and modified bits to zero. Alternatively, if the hit is for a read request, the invention checks to determine whether the modified bit is set (item 918). If it is not, processing proceeds to item A (shown below in FIG. 9B). If the hit is for a cast out transaction (replacement of a cache line), processing proceeds to item B shown in FIG. 9C. If the modified bit is set (item 918), processing proceeds to item 920 where the invention evicts this memory line from the node which holds this line. Then, the invention sets the presence and the modified bits to 0. Processing flows from items 916 and 920 to item 904 and processing continues as discussed above. This completes the processing as shown by item 914.

Referring now to FIG. 9B, if the hit is for a read transaction without the modified bit set, processing will proceed from item 918 in FIG. 9A to item 930 in FIG. 9B. In item 930, the invention determines whether the entry is stored in a sparse format. If it is, processing proceeds to item 932 where the presence bit is set for the requesting node. This completes processing in item 940. Otherwise, if the entry is not stored in sparse format, the invention determines whether the entry can be stored elsewhere in a sparse format in item 934. If it can, processing proceeds to item 938 where the entry is moved into the sparse format and the presence bit is set for the requesting node. If it cannot be stored elsewhere in the sparse format, processing proceeds to item 936 where the invention again evicts an entry based upon any commonly known eviction algorithm. After this, processing again returns to item 938. Once processing is completed from item 938, it proceeds to item 940 to indicate the end of processing.

For the cast out situation (B) shown in FIG. 9A, processing proceeds to item 950 in FIG. 9C. In item 950, the invention determines whether the modified bit has been set. If it has, processing proceeds to item 952 where the invention sets the presence and modified bits to zero. This initially completes processing in item 954. If the modified bit has not been set, processing proceeds from item 950 to item 956 where the invention determines whether the entry is stored in a CCR format. If it is, the invention sets the presence bit to zero in item 958 and the processing is again completed as shown by item 954. If the entry is not stored in CCR format, processing proceeds from item 956 to item 960 where the invention sets the presence bit of the requesting node to zero. Then the invention determines whether the memory line is still shared by more than one node in item 962. If it is, processing is completed as shown by item 954. If the memory is not still shared by more than one node, processing proceeds from item 962 to item 964. In item 964 the invention checks whether the entry needs to be and can be stored in the CCR format. If it does not need to be or cannot be so stored in the CCR format, processing is again completed, as represented by item 954. Otherwise, if it needs to be and can be stored in the CCR format, the invention proceeds to item 966 where its stores the entry into CCR format and sets the presence bit.

One of the important features of the invention is the dynamic switching between formats. The present invention not only tries to store memory lines in CCR format and shifts to sparse format as more than one node share this line but the invention is also capable of shifting from sparse format back to CCR format as memory lines get cast out from caches and the number of nodes holding this line becomes one again. Another feature is that the invention tries to store multiple entries in CCR format in the same space occupied by an entry in the sparse format ("multiple entries" means entirely different memory lines which differ in the tag bits).

A representative hardware environment for practicing the present invention is depicted in FIG. 10, which illustrates an information handling/computer system in accordance with the subject invention, having at least one processor or central processing unit (CPU) 10. CPUs 10 are interconnected via system bus 12 to random access memory (RAM) 14, read-only memory (ROM) 16, an input/output (I/O) adapter 18 for connecting peripheral devices, such as disk units 11 and tape drives 13, to bus 12, user interface adapter 19 for connecting keyboard 15, mouse 17, speaker 103, microphone 104, and/or other user interface devices such as touch screen device (not shown) to bus 12, communication adapter 105 for connecting the information handling system to a data processing network, and display adapter 101 for connecting bus 12 to display device 102. A program storage device readable by the disk or tape units, is used to load the instructions which operate the invention also loaded onto the computer system.

In conclusion, the inventive dynamic CCR/sparse directory stores the same number of entries like a sparse implementation of comparable area in the worst case and stores two or more times the number of entries like a sparse implementation of comparable area in the best case. For "n" nodes determining hit/miss determination will involve at least "n−1" associative comparisons which is possible with wide data embedded DRAMs. The algorithm is more complex than the sparse implementation but this is only logical complexity and does not affect area significantly.

While the invention has been described in terms of preferred embodiments, those skilled in the art will recognize that the invention can be practiced with modification within the spirit and scope of the appended claims.

What is claimed is:

1. A method for maintaining coherence of memory lines in a shared memory multiprocessor system that includes a system area network and a plurality of compute nodes connected to said system area network, wherein each of said compute nodes includes a main memory, a shared cache, a coherence controller and a directory, said method comprising:

maintaining, by each of said compute nodes, state information of said main memory cached in said shared caches of other compute nodes;

organizing a cache directory so that the state information can be stored first in an area efficient directory format;

switching to a sparse directory format if an entry is shared by more than one compute node; and dynamically switching between said area efficient directory format and said sparse directory format so as to maximize the number of entries stored in the directory.

2. The method in claim 1, wherein said area efficient directory format comprises one identifier bit, tag bits, one presence bit, and one modified bit.

3. The method in claim 2, wherein said method stores said entries in said area efficient directory format only if the memory lines referenced by the entries are shared by exactly one node.

4. The method in claim 1, wherein said sparse directory format comprises one identifier bit, tag bits, presence bits, and one modified bit.

5. The method in claim 4, wherein said method stores said entries in said sparse directory format if the memory lines referenced by the entries are shared by more than one node.

6. The method in claim 1, wherein the size of said directory is limited and wherein said method further comprises evicting items from said directory if insufficient space is available to store a new entry.

7. A method for maintaining coherence of memory lines in a shared cache memory system that includes a plurality of compute nodes, each of said compute nodes having a CCR/sparse shadow directory, said method comprising:

storing entries representing lines in said shared cache in said CCR/sparse shadow directory in one of a first format and a second format, wherein said first format represents a single node's usage of a single line in said shared cache; and wherein said second format represents a plurality of nodes' sharing of a single line in said shared cache.

8. The method in claim 7, wherein said first format comprises one identifier bit, tag bits, one presence bit, and one modified bit.

9. The method in claim 8, wherein said method stores said entries in said first format only if the memory lines referenced by the entries are shared by exactly one node.

10. The method in claim 7, wherein said second format comprises one identifier bit, tag bits, presence bits, and one modified bit.

11. The method in claim 10, wherein said method stores said entries in said second format if the memory lines referenced by the entries are shared by more than one node.

12. The method in claim 7, wherein said method attempts to store said entries in said first format before storing said entries in said second format.

13. The method in claim 7, wherein the size of said directory is limited and wherein said method further comprises evicting items from said CCR/sparse shadow directory if insufficient space is available to store a new entry.

14. A shared memory multiprocessor system having a system area network, said system comprising:

a plurality of compute nodes connected to said system area network, wherein each of said compute nodes includes:

a main memory;

a shared cache connected to said main memory;

a CCR/sparse shadow directory connected to said shared cache; and a coherence controller connected to said CCR/sparse shadow directory, wherein said CCR/sparse shadow directory is adapted to store entries, representing lines in said shared cache, in one of a first format and a second format, wherein said first format represents a single node's sharing of a single line in said shared cache; and wherein said second format represents a plurality of nodes' usage of a single line in said shared cache.

15. The system in claim 14, wherein said first format comprises one identifier bit, tag bits, one presence bit, and one modified bit.

16. The system in claim 15, wherein said CCR/sparse shadow directory is adapted to store said entries in said first format only if the memory lines referenced by the entries are shared by exactly one node.

17. The system in claim 14, wherein said second format comprises one identifier bit, tag bits, presence bits, and one modified bit.

18. The system in claim 17, wherein said CCR/sparse shadow directory is adapted to store said entries in said second format if the memory lines referenced by the entries are shared by more than one node.

19. The system in claim 14, wherein said CCR/sparse shadow directory attempts to store said entries in said first format before storing said entries in said second format.

20. The system in claim 14, wherein the size of said CCR/sparse shadow directory is limited and wherein said coherence controller is adapted to evict items from said CCR/sparse shadow directory if insufficient space is available to store a new entry.

21. A shared memory multiprocessor system having a system area network, said system comprising:

a plurality of compute nodes connected to said system area network, wherein each of said compute nodes includes a shared cache and a CCR/sparse shadow directory connected to said shared cache, wherein said CCR/sparse shadow directory is adapted to store entries, representing lines in said shared cache, in one of a first format and a second format, wherein said first format represents a single node's usage of a single line in said shared cache; and wherein said second format represents a plurality of nodes' sharing of a single line in said shared cache.

22. The system in claim 21, wherein said first format comprises one identifier bit, tag bits, one presence bit, and one modified bit.

23. The system in claim 22, wherein said CCR/sparse shadow directory is adapted to store said entries in said first format only if the memory lines referenced by the entries are shared by exactly one node.

24. The system in claim 21, wherein said second format comprises one identifier bit, tag bits, presence bits, and one modified bit.

25. The system in claim 24, wherein said CCR/sparse shadow directory is adapted to store said entries in said second format if the memory lines referenced by the entries are shared by more than one node.

26. The system in claim 21, wherein said CCR/sparse shadow directory attempts to store said entries in said first format before storing said entries in said second format.

27. The system in claim 21, wherein the size of said CCR/sparse shadow directory is limited and wherein said CCR/sparse shadow directory is further adapted to evict items from said CCR/sparse shadow directory if insufficient space is available to store a new entry.

28. A program storage device readable by machine tangibly embodying a program of instructions executable by said machine for performing a method for maintaining coherence of memory lines in a shared cache memory system that includes a plurality of compute nodes, each of said compute nodes having a CCR/sparse shadow directory, said method comprising:

storing entries representing lines in said shared cache in said CCR/sparse shadow directory in one of a first format and a second format, wherein said first format represents a single node's usage of a single line in said shared cache; and wherein said second format represents a plurality of nodes' sharing of a single line in said shared cache.

29. The program storage device in claim 28, wherein said first format comprises one identifier bit, tag bits, one presence bit, and one modified bit.

30. The program storage device in claim 29, wherein said method stores said entries in said first format only if the memory lines referenced by the entries are shared by exactly one node.

31. The program storage device in claim 28, wherein said second format comprises one identifier bit, tag bits, presence bits, and one modified bit.

32. The program storage device in claim 31, wherein said method stores said entries in said second format if the memory lines referenced by the entries are shared by more than one node.

33. The program storage device in claim 28, wherein said method attempts to store said entries in said first format before storing said entries in said second format.

34. The program storage device in claim 28, wherein the size of said directory is limited and wherein said method further comprises evicting items from said CCR/sparse shadow directory if insufficient space is available to store a new entry.

\* \* \* \* \*